United States Patent [19]
Hara

[11] 4,450,391
[45] May 22, 1984

[54] CENTRIFUGE PROTECTIVE CIRCUITS FOR PREVENTING EXCESSIVE SPEED OF DIFFERENT ROTOR TYPES

[75] Inventor: Minoru Hara, Sakado, Japan

[73] Assignee: Kabushiki Kaisha Kubota Seisakusho, Tokyo, Japan

[21] Appl. No.: 464,813

[22] Filed: Feb. 8, 1983

[30] Foreign Application Priority Data

Feb. 17, 1982 [JP] Japan .......................... 57-21823[U]

[51] Int. Cl.³ ...................... G05B 9/00; G05B 11/12; G05B 11/18

[52] U.S. Cl. .................................. 318/313; 318/326; 318/480; 494/9

[58] Field of Search ............. 494/9, 10; 250/231.5 E; 318/313, 326, 327, 480, 314, 369, 346; 307/117

[56] References Cited

U.S. PATENT DOCUMENTS

| | | | |
|---|---|---|---|
| 2,733,857 | 2/1956 | Beams | 494/10 X |
| 3,445,677 | 5/1969 | Leftwich | 307/117 |
| 3,931,514 | 1/1976 | Patterson | 307/117 X |
| 3,982,162 | 9/1976 | Olliffe | 318/313 |

*Primary Examiner*—G. Z. Rubinson
*Assistant Examiner*—Bentsu Ro
*Attorney, Agent, or Firm*—Pollock, VandeSande & Priddy

[57] ABSTRACT

A light emitting element and a photo detector are disposed opposite each other in an outer housing of a centrifuge. When an angle rotor is mounted on a motor shaft, light emitted from the light emitting element is received by the photo detector without being intercepted by the angle rotor and, by the output of the photo detector, a permissible maximum revolving speed of the angle rotor is set high. When a swing rotor is mounted on the motor shaft, the light from the light emitting element is intercepted by the swing rotor, and hence is not received by the photo detector and, by the output of the photo detector, a permissible maximum revolving speed of the swing rotor is set low.

11 Claims, 10 Drawing Figures

CENTRIFUGE PROTECTIVE CIRCUITS FOR PREVENTING EXCESSIVE SPEED OF DIFFERENT ROTOR TYPES

BACKGROUND OF THE INVENTION

The present invention relates to a centrifuge adapted for use with a plurality of types of rotors of different maximum revolving speeds and, more particularly, to an arrangement for automatically discriminating the type of rotor mounted on the rotary shaft of a motor of the centrifuge.

In this kind of centrifuge, a permissible maximum revolving speed is determined according to the type of rotor used and driving at a speed higher than the maximum revolving speed entails a danger of an accident, such as breakage of the rotor or the centrifuge. It is general practice in the prior art that predetermined permissible maximum revolving speeds of rotors are changed over by an operator through a switch or the like in accordance with the rotor to be used, and that when the revolving speed of the rotor exceeds its permissible maximum speed, the motor drive power source is automatically cut off, thus preventing an accident. With such a conventional centrifuge, however, since the permissible maximum revolving speed is set by the operator in accordance with the rotor to be used, it is likely that the operator makes a mistake in setting the revolving speed or forgets to set it. For example, an angle rotor is driven at a maximum revolving speed of 15,000 rpm and a swing rotor 12,000 rpm. It has often been the case that the swing rotor is driven at the maximum revolving speed of the angle rotor, resulting in breakage of the swing rotor or the centrifuge.

SUMMARY OF THE INVENTION

It is an object of the present invention to provide an automatic rotor type discriminator which automatically discriminates the type of a rotor used, permitting automatic setting of its permissible maximum revolving speed.

According to the present invention, a light emitting element and a photo detector are disposed opposite each other in an outer housing of a centrifuge. The light emitting element and the photo detector are positioned so that the optical path therebetween is not intercepted by a rotor of one kind mounted on the motor shaft, but that the optical path is intercepted by a rotor of another kind mounted on the motor shaft. In this case, it is preferred that the optical path is not intercepted when the rotor of a higher permissible maximum revolving speed is mounted on the motor shaft. Furthermore, it is decided by the output of the photo detector whether the optical path is intercepted by the rotor mounted on the motor shaft and, on the basis of the decision result, maximum revolving speed setting means is controlled. That is to say, it is decided by the output of the photo detector whether the rotor on the motor shaft is, for instance, an angle rotor or a swing rotor and, in the case of the angle rotor, the permissible maximum revolving speed is set high and, in the case of the swing rotor, it is set low. This setting can be achieved by controlling, in accordance with the abovesaid decision result, a permissible maximum revolving speed switch manually operated in the past.

DESCRIPTION OF THE PREFERRED EMBODIMENTS

Figure 1:
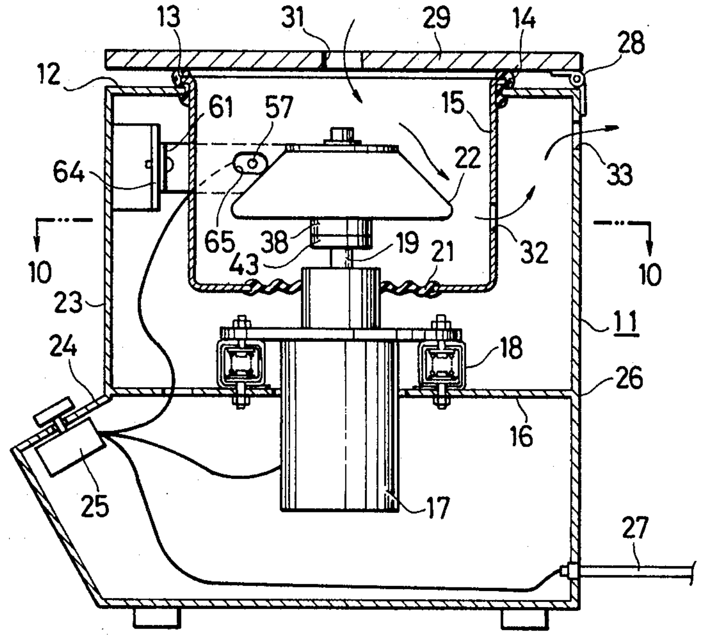
FIG. 1 is a sectional view illustrating an example of a centrifuge employing the automatic rotor type discriminator of the present invention.

A description will be given first, with reference to FIGS. 1 and 2, of the general construction of a centrifuge. A top panel 12 of an outer housing 11 of the centrifuge has a circular opening 13 and an inner housing 15 is disposed in the outer housing 11, with the marginal portion of the inner housing 15 engaged with the marginal portion of the opening 13. A support plate 16 is fixedly mounted in the outer housing 11 to extend laterally under the inner housing 15. A motor 17 is disposed in a hole made in the support plate 16 centrally thereof and is supported on the support plate 16 through damper means 18. A rotary shaft 19 of the motor 17 is inserted into the inner housing 15 through a hole made in the bottom of the inner housing 15 centrally thereof, and the space between the circumference of the bearing portion of the motor 17 and the bottom panel of the inner housing 15 is closed by an elastic closing plate 21.

Mounted on the motor shaft 19 inserted into the inner housing 15 is a rotor, for instance, an angle rotor 22. An operator panel 24 is provided aslant to project forwardly from the central portion of a front panel 23 of the outer housing 11. By manipulating a knob or the like on the operator panel, the motor 17 is controlled through a control unit 25 mounted on the inside of the operator panel 24. To the control unit 25 is connected a power supply cord 27 led out of the outer housing 11 through the lower end portion of its rear panel 26 so that the control unit 25 can be connected to the commercial power source.

A lid 29 is pivotally mounted by a hinge 28 on the rear end portion of the top panel 12 of the outer housing 11, for covering the opening of the inner housing 15. The lid 29 has formed therein an air inlet port 31 substantially in alignment with the center of rotation of the angle rotor 22. By the rotation of the rotor 22 the air pressure in the inner housing 15 in the vicinity of the air inlet port 31 is made negative and, in consequence, air is drawn into the inner housing 15 from the outside through the air inlet port 31 to flow along the rotor 22 and is blown out into the outer housing 11 through an air outlet port 32 made in the inner housing 15, thereafter being released to the outside through an exhaust port 33 made in the rear panel 26 of the outer housing 11. By this air flow the angle rotor 22 is cooled.

Figure 3:
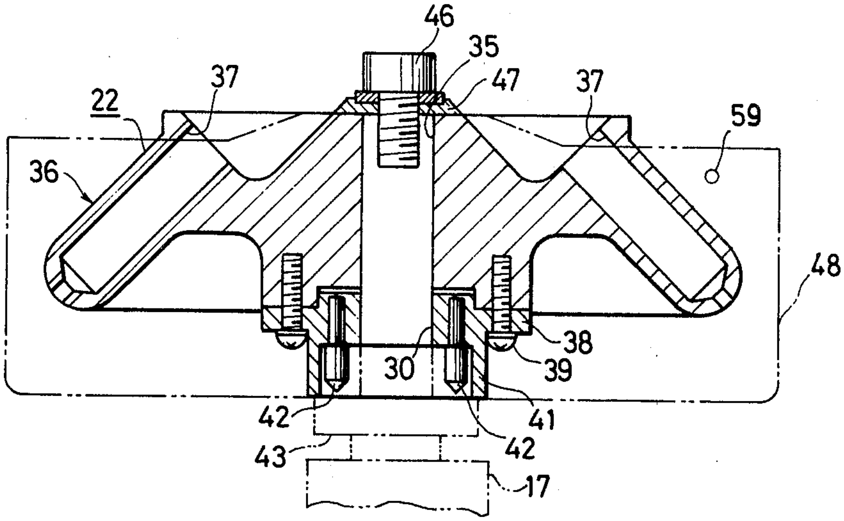
FIG. 3 is a sectional view showing an example of an angle rotor.

The angle rotor 22 is substantially in the form of a truncated cone such, for example, as shown in FIG. 3 and has a motor shaft insertion hole 35 made in the truncated-conical body centrally thereof and a plurality of sedimentation tube receiving holes 37 made at equiangular intervals about the motor shaft insertion hole 35 to extend down aslant along the peripheral surface 36 of the truncated-conical body. To the underside of the angle rotor 22 is attached by screws 39 a metal fixture 38, the underside of which has formed integrally therewith a sleeve 41 to extend downwardly thereof. Inside of the sleeve 41, for example, two knock pins 42 are fitted into holes made in the underside of the metal fixture 38 and project downwardly thereof. The metal fixture 38 has a through hole 30 in alignment with the motor shaft insertion hole 35 of the rotor body.

Figure 4:
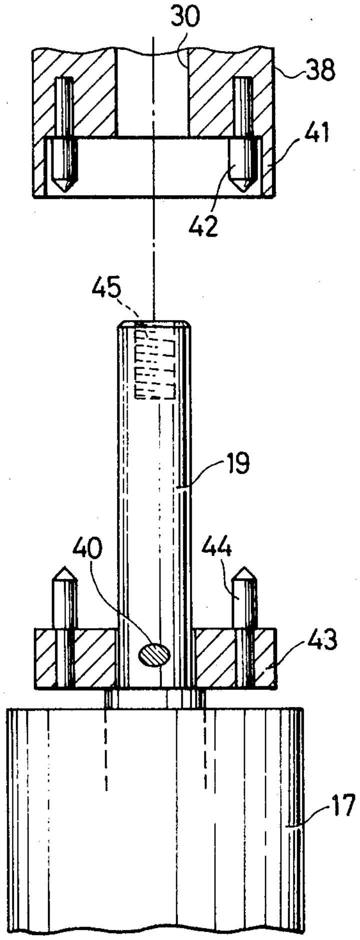
FIG. 4 is a sectional view showing a rotor mounting portion of a motor shaft.

On the other hand, the rotary shaft 19 of the motor 17 has affixed thereto a disc-shaped metal coupling 43 as shown in FIG. 4 and, for instance, four coupling pins 44 are planted at equiangular intervals on the top surface of the metal coupling 43 and, furthermore, a tapped hole 45 is made in the top end face of the rotary shaft 19. The rotary shaft 19 of the motor 17 is inserted into the motor shaft insertion hole 35 of the angle rotor 22 and a bolt 46 (FIG. 3) is screwed into the tapped hole 45 of the rotary shaft 19 through a suitable washer 47, fixing the angle rotor 22 to the metal coupling 43. In this case, the knock pins 42 of the angle rotor 22 and the coupling pins 44 of the motor 19 lie on the same circle, so that by the rotation of the motor 17, the coupling pins 44 are moved into contact with the knock pins to press them, rotating the rotor 22. The metal coupling 43 and the rotary shaft 19 of the motor 17 are coupled together by a coupling pin 40 inserted thereinto.

Figure 6A:
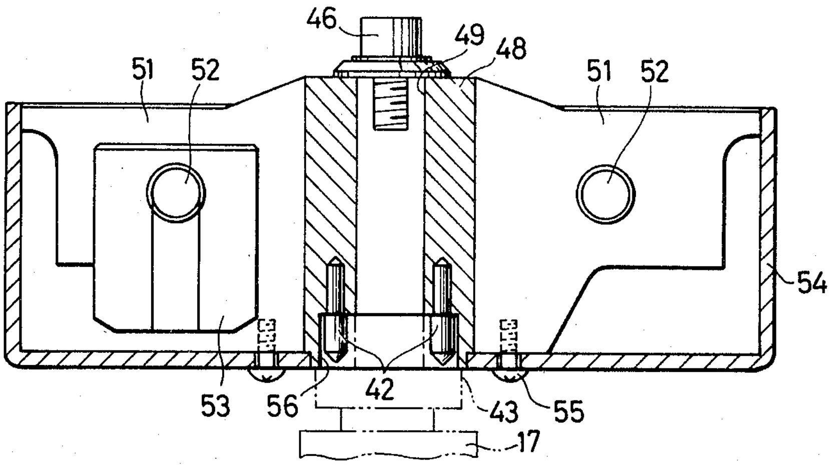
FIG. 6A is a sectional view showing an example of a swing rotor.
Figure 6B:
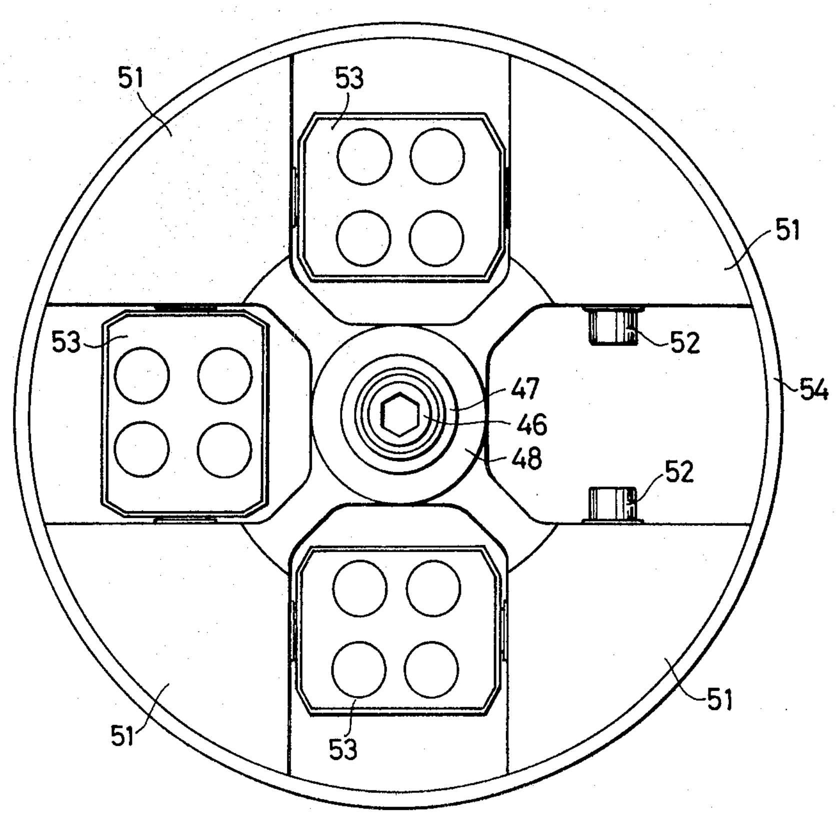
FIG. 6B is a plan view of the swing rotor depicted in FIG. 6A.

A swing rotor 48 has bored therethrough a motor shaft insertion hole 49 as shown, for example, in FIGS. 6A and 6B, and has a plurality of arms 51 formed at equiangular intervals about the motor shaft insertion hole 49 to extend radially thereof. Between adjacent ones of the arms 51 is rotatably suspended a bucket 53 on a pair of fixed pins 52 projecting from the arms in opposing relation. In FIGS. 6A and 6B, one of the buckets is omitted in order to show the pins 52. In the illustrated example, the swing rotor 48 has a cover 54 disposed in a manner to surround the rotor and the buckets, and the bottom panel of the cover 54 is fixed by screws 55 to the rotor 48. Also in this case, in order that the swing rotor 48 may be mounted on the rotary shaft 19 of the motor 17, the motor shaft insertion hole 49 of the angle rotor 48 is expanded in its bottom to form therein a recess 56 corresponding to the space defined by the inner peripheral surface of the sleeve 41 of the angle rotor 22, and the knock pins 42 are buried in the bottom of the recess 56. Accordingly, the swing rotor 48 can also be mounted on the rotary shaft 19 of the motor 17 as is the case with the angle rotor 22.

Figure 2:
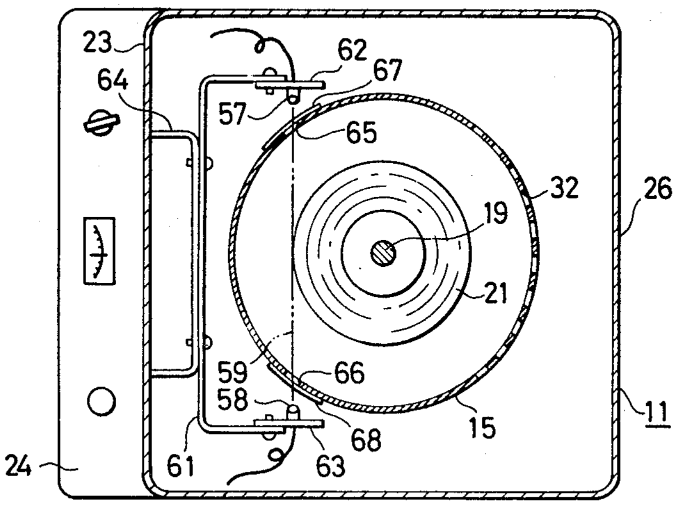
FIG. 2 is a sectional view taken on the line 10—10 in FIG. 1.

In this embodiment, a light emitting element 57 and a photo detector 58 for receiving light emitted from the light emitting element 57 are provided opposite each other in close proximity to the rotor mounted on the rotary shaft 19 of the motor 17 as shown in FIGS. 1 and 2. In this case, the light emitting element 57 and the photo detector 58 are positioned so that when the rotor of a higher permissible maximum revolving speed is mounted on the rotary shaft 19 of the motor 17, an optical path 59 may be formed without being affected by the rotor, but that when the rotor of a lower permissible maximum revolving speed is mounted, the optical path 59 is intercepted by the rotor. For example, in this embodiment, since the permissible maximum revolving speed of the angle rotor 22 is higher than that of the swing rotor 48, the positions of the light emitting element 57 and the photo detector 58 are selected so that when the angle rotor 22 is mounted on the rotary shaft 19 of the motor 17, the optical path 59 may be formed, for instance, about 5 mm above the intermediate portion of the outer peripheral surface 36 of the angle rotor 22 in the vertical direction.

In this embodiment the light emitting element 57 and the photo detector 58 are provided in the outer housing 11 on the outside of the inner housing 15. An angle bracket 61 is provided which is bent at both ends in the same direction, and printed-circuit boards 62 and 63 are respectively mounted on both bent portions of the angle bracket 61, and the light emitting element 57 and the photo detector 58 are mounted on the printed-circuit boards 62 and 63, respectively. In this example, the angle bracket 61 is fixed to the front panel 23 of the outer housing 11 through a fixture 64 in adjacent but parallel relation to the front panel 23. The inner housing 15 has made therein elongated holes 65 and 66 to extend in its circumferential direction in alignment with the light emitting element 57 and the photo detector 58, respectively. The elongated holes 65 and 66 are covered with thin transparent plates 67 and 68 so that light from the light emitting element 57 may pass through the inner housing 15 to reach the photo detector 58. The transparent plates 67 and 68 are attached as by an adhesive binder to the inner housing 15. By forming the elongated holes 65 and 66 to extend in the circumferential direction of the inner housing 15, positioning of the light emitting element 57 and the photo detector 58 relative to the inner housing 15 can easily be achieved although they are disposed obliquely to the peripheral surface of the inner housing 15 as shown in FIG. 2 and, in addition, the holes 65 and 66 can be made small.

By the way, in order to prevent that air is blown against the light emitting element 57 and the photo detector 58 from the outside to stain them, it is preferable that the air outlet port 32 be made in the inner housing 15 on the opposite side from the light emitting element 57 and the photo detector 58 with respect to the rotary shaft 19, i.e. on the side of the rear panel 26 as shown in FIG. 2. In the case where the inner housing 15 is formed of a transparent synthetic resinous material, the light emitting element 57 and the photo detector 58 can be disposed opposite each other on the outside of the inner housing 15 without forming the elongated holes 65, 66 therein.

The light emitting element 57 and the photo detector 58 are mounted beforehand on the angle bracket 61 so that their optical axes may be aligned with each other and then the angle bracket 61 is secured to the fixture 64. For positioning the light emitting element 57 and the photo detector 58 relative to the elongated holes 65 and 66, it is sufficient only to preset the height of the fixture 64. That is to say, as shown in FIG. 1, the position of the motor 17 and accordingly the position of the metal coupling 43 of the rotary shaft 19 of the motor 17 in the vertical direction is defined by the support plate 16 to hold the rotor mounted on the rotary shaft 19 at a fixed height and the elongated holes 65 and 66 of the inner housing 15 are also positioned at a fixed height; therefore, it is sufficient only to preset the height of the fixture 64 so that the heights of the elongated holes 65 and 66, the rotor and the angle bracket 61 may bear predetermined relationships when the angle bracket 61 is mounted in a predetermined posture on the fixture 64 at a predetermined position. The light emitting element 57 and the photo detector 58, that is, the angle bracket 61 can easily be mounted on and dismounted from the outer housing 11 when the inner housing 15 is removed from the top panel 12 of the outer housing 11.

Figure 7:
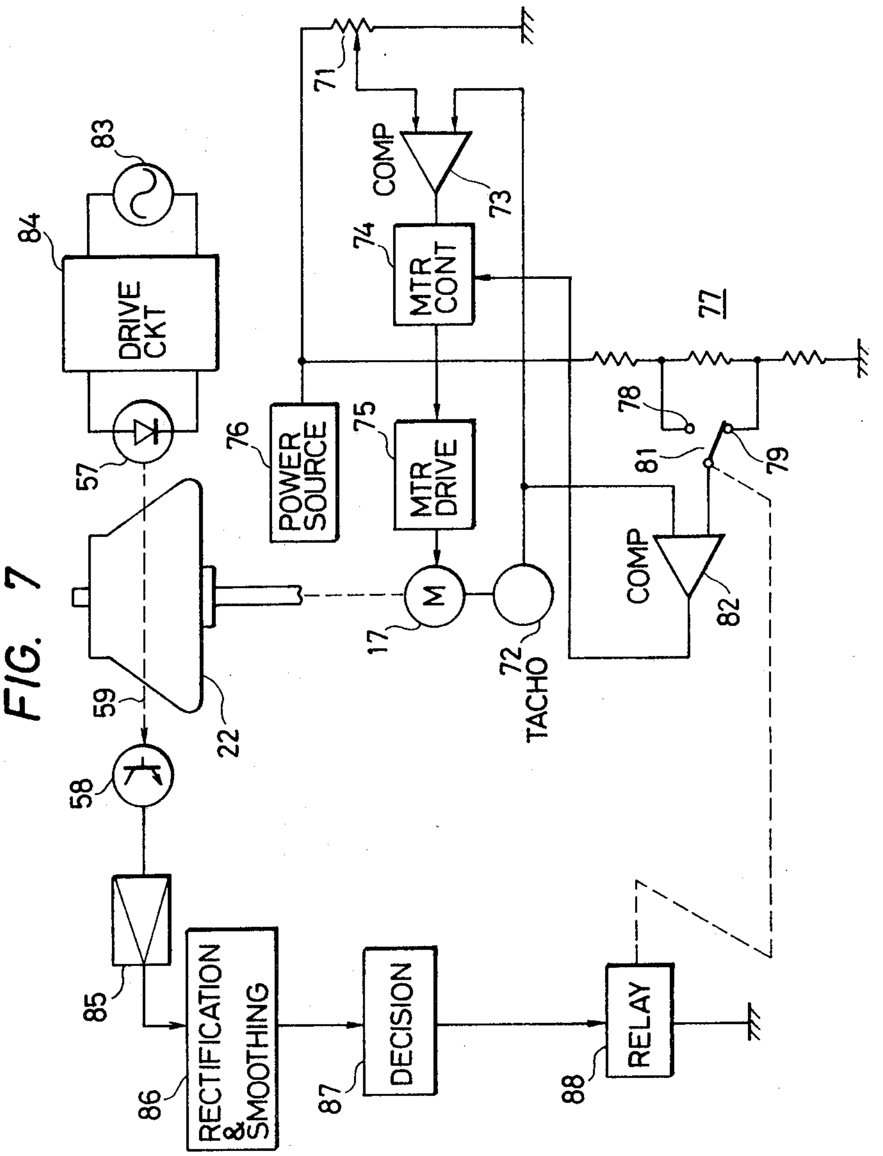
FIG. 7 is a block diagram illustrating an example of an electrical arrangement of a part for automatically setting a permissible maximum revolving speed.

The revolving speed of the rotor is controlled in the following manner: For instance, as shown in FIG. 7, a value set by a revolving speed setting circuit 71, formed by a variable resistor supplied with a constant voltage, and the output from a revolving speed detector 72 connected to the motor 17, for detecting its revolving speed, such as a tacho generator, are compared by a comparator 73 and, on the basis of the comparison result, a motor control circuit 74 is activated to operate a motor drive circuit 75, driving the motor 17. To the motor drive circuit 75, the revolving speed setting circuit 71 and so on are applied required power and voltage from a power source circuit 76 although not specifically shown in FIG. 7. In this way, the rotor is driven at the speed set by the revolving speed setting circuit 71.

As a permissible maximum revolving speed setting part 77 is formed a voltage divider for dividing the output voltage of the power source circuit 76. Higher and lower divided voltage output terminals 78 and 79 are selectively changed over by a switch 81 to one of input sides of a comparator 82. The comparator 82 is supplied to the other input side with the output of the tacho generator 72. When the revolving speed of the rotor is higher than the value set by the permissible maximum revolving speed setting part, the control circuit 74 is controlled by the output of the comparator 82, stopping the drive of the motor 17. In the prior art, the switch 81 is set by a knob on the operator panel 24 to the terminal 78 or 79 in accordance with the type of the rotor mounted on the rotary shaft of the motor 17.

In the present invention, the switch 81 is changed over automatically discriminating the type of rotor according to the light receiving state of the photo detector 58. A light emitting diode used as the light emitting element 57 is modulated and driven, for example, by a 3 KHz oscillator 83 via a drive circuit 84. Light thus modulated by the AC signal is received by the photo detector 58, which is formed, for instance, by a photo transistor, and its output is applied to a filter-amplifier 85, from which is taken out only the oscillation frequency component of the oscillator 83, that is, the modulated frequency component. This output is rectified and smoothed by a rectifier-smoothing circuit 86 and when the smoothed output is decided by a decision circuit 87 to exceed a predetermined value, a relay 88 is driven to change over the switch 81 to the terminal 78, setting the permissible revolving speed high. In the case where the light emitted from the light emitting element 57 is intercepted, however, the output of the rectifier-smoothing circuit 86 does not reach the predetermined value, so that the relay 88 is not energized and the switch 81 is connected to the terminal 79, setting the permissible maximum revolving speed low.

According to the above-described embodiment, when the angle rotor 22 is mounted on the rotary shaft 19 of the motor 17, the light from the light emitting element 57 is received by the photo detector 58 and the permissible maximum revolving speed is set to the higher value on the side of the terminal 78; accordingly, the angle rotor 22 can be driven at the high speed. On the other hand, when the swing rotor 48 is mounted on the rotary shaft 19 of the motor 17, the light from the light emitting element 57 is intercepted by the swing rotor 48 and, hence does not reach the photo detector 58, so that the switch 81 is connected to the terminal 79 and the permissible maximum revolving speed is set to the lower value. Accordingly, even if the revolving speed setting circuit 71 is set to a value exceeding the permissible maximum revolving speed of the swing rotor 48 and, as a result, when the revolving speed of the swing rotor 48 exceeds its permissible maximum revolving speed, the output from the comparator 82 is inverted and the control circuit 74 is controlled to stop the drive of the motor 17 since the switch 81 is connected to the terminal 79.

As described above, according to the present invention, the type of the rotor used is automatically discriminated and the permissible maximum revolving speed is automatically set correspondingly. Accordingly, there is no possibility of the swing rotor 48 being driven in excess of the higher permissible maximum revolving speed set by mistake. Furthermore, since it is arranged that the rotor is allowed to revolve at the higher permissible maximum revolving speed only when the light from the light emitting diode 57 reaches the photo detector 58, the permissible maximum revolving speed will always be set to the lower one whenever the light from the light emitting element 57 is not received by the photo detector 58 or the output of the rectifier-smoothing circuit 86 is reduced by some cause, thus ensuring safety. That is, an arrangement wherein the light from the light emitting element 57 is not received by the photo detector 58 when the angle rotor 22 is mounted on the rotary shaft 19 but the light is received when the swing rotor 48 is mounted, is dangerous in that when the light is not received by the photo detector 58 because of a trouble, the maximum revolving speed is set higher than the permissible maximum revolving speed of the swing rotor 48. But the above-described embodiment is free from such a possibility.

Moreover, since the optical path 59 between the light emitting element 57 and the photo detector 58 is set up at a position slightly above the outer peripheral surface of the angle rotor 22 as described previously, if the angle rotor 22 is not correctly mounted on the rotary shaft 19 of the motor 17 because the knock pins 42 and the coupling pins 44 abut against each other in their axial direction in FIG. 4, or because of tight fitting of the rotary shaft receiving hole 35 and the rotary shaft 19, the light from the light emitting element 57 is intercepted by the angle rotor 22; accordingly, although the angle rotor 22 is mounted, the permissible maximum revolving speed is set low, thus eliminating the possibility of the rotor revolving speed becoming high in such an unstable rotor mounting state.

Besides, in the case where the light from the light emitting element 58 is modulated by the output of the oscillator 83, even if external light is incident on the photo detector 58, for example, because the outer housing 11 and/or the lid 29 is transparent partially or wholly, an accurate operation can be ensured by detecting the modulated signal without being affected by the external light. On the contrary, when the outer housing 11 and the lid 29 are closed up tightly against the ambient light, it is also possible to omit the oscillator 83 and to drive the light emitting element 57 by DC.

In the case of employing the transparent plates 67, 68 for closing the elongated holes 65, 66 as shown in FIG. 2, dust in the air from the outside is not directly blown against the light emitting element 57 and the photo detector 58 and, accordingly, they are not stained by dust or the like and free from malfunction.

Figure 8:
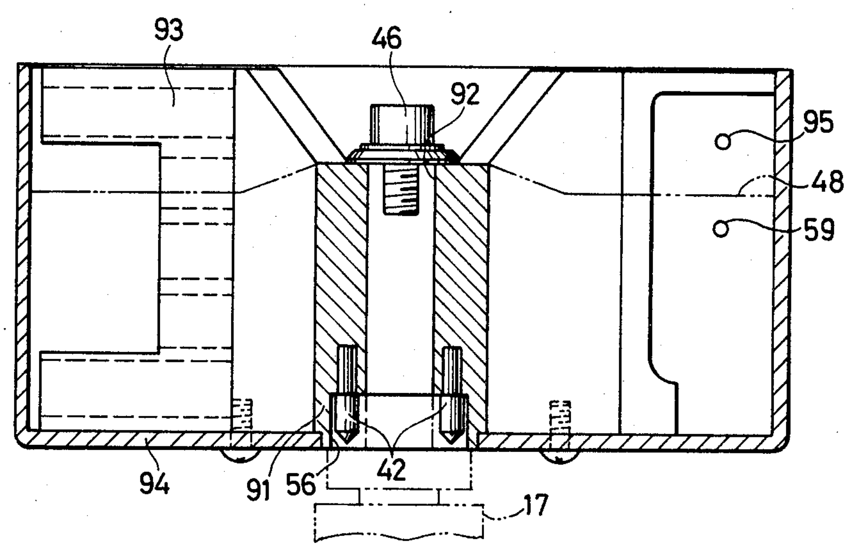
FIG. 8 is a sectional view showing an example of a horizontal rotor.
Figure 5:
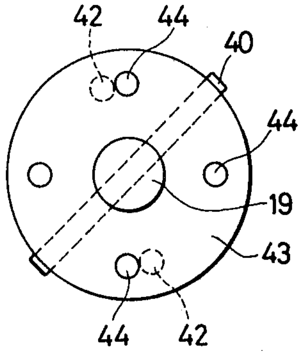
FIG. 5 is a plan view of a metal coupling 43.

A horizontal rotor 91 such, for example, as shown in FIG. 8 may sometimes be used. The horizontal rotor 91 is shown, for instance, in FIGS. 3 to 5 of U.S. Pat. No. 4,341,342 issued on July 27, 1982. In FIG. 8, the horizontal rotor 91 has a through hole 92 for the insertion thereinto of the rotary shaft 19 of the motor 17. Tube racks 93 are dismountably mounted on the rotor 91 at equiangular intervals about the through hole 92 and test tubes are inserted into lateral tube receiving holes made in each tube rack. A cover 94 is fixed to the rotor 91 in a manner to surround it. The recess 56 is formed in the bottom of the rotor 91 and the knock pins 42 are buried in the recess 56.

Figure 9:
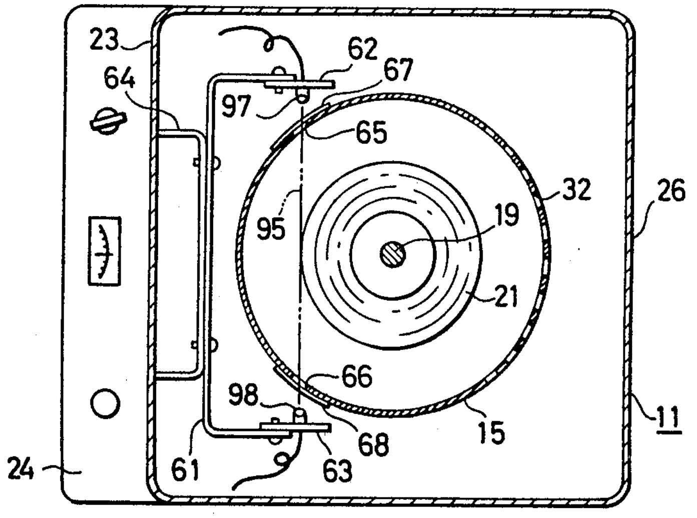
FIG. 9 is a sectional view of a centrifuge adapted to discriminate between more than two types of rotor.

When the horizontal rotor 91 is mounted on the rotary shaft 19 of the motor 17, its top surface lies at a position higher than that of the swing rotor 48 as indicated by the broken line. Accordingly, by providing an optical path 95 between another pair of elements, consisting of a light emitting element 97 and a photo detector 98 as shown in FIG. 9 (the elements 57, 58 are behind the elements 97, 98 and therefore cannot be seen in FIG. 9), above the optical path 59 between the light emitting element 57 and the photo detector 58 at a position where the optical path 95 is not intercepted by the swing rotor 48 but intercepted by the horizontal rotor 91 as shown in FIG. 8, it is also possible to discriminate three types of rotors.

Furthermore, the same rotor may sometimes be used for centrifugal separation of blood in capillary tubes for measuring the hematocrit value and for centrifugal separation of samples in sedimentation tubes. In this case, the rotor is driven at a speed of 12,000 rpm for measurement of the hematocrit value and at a speed of about 5,000 rpm for the centrifugal sedimentation of samples. In the case of the hematocrit value measurement, the capillary tubes do not protrude from the top surface of the rotor but, in the case of the centrifugal sedimentation of samples, the sedimentation tubes project out from the top surface of the rotor. Accordingly, a permissible maximum revolving speed for each case can be automatically set by optically detecting whether the top surface of the rotor is flat.

It will be apparent that many modifications and variations may be effected without departing from the scope of the novel concepts of the present invention.

What is claimed is:

1. An automatic rotor type discriminator for a centrifuge adapted so that different types of rotors can be mounted on a motor shaft, comprising:

a light emitting element disposed in an outer housing of the centrifuge, for emitting light;

a photo detector disposed in said outer housing in opposing relation to said light emitting element, for receiving and converting light from said light emitting element into an electric signal, said light emitting element and said photo detector being positioned so that when a first type of rotor is mounted on said motor shaft, the optical path between said light emitting element and said photo detector is not intercepted by said first type of rotor, but that when a second type of rotor different from said first type of rotor is mounted on said motor shaft, said optical path is intercepted by said second type of rotor;

deciding means for determining from the output of said photo detector whether said optical path is intercepted by the rotor mounted on said motor shaft; and maximum revolving speed setting means for setting a maximum revolving speed of said rotor mounted on said motor shaft in accordance with the determination of said deciding means.

2. An automatic rotor type discriminator according to claim 1 wherein said optical path is not intercepted by a rotor of a higher permissible maximum revolving speed but is intercepted by a rotor of a lower permissible maximum revolving speed.

3. An automatic rotor type discriminator according to claim 2 wherein said optical path is positioned so that when said rotor of the higher permissible maximum revolving speed is mounted on the motor shaft, said optical path lies above said rotor, and that when said rotor is not correctly mounted on said motor shaft, said optical path is intercepted by said rotor.

4. An automatic rotor type discriminator according to any one of claims 1 to 3 wherein said rotor is disposed in an inner housing inside said outer housing; and said light emitting element and said photo detector are disposed outside said inner housing.

5. An automatic rotor type discriminator according to claim 4 wherein said inner housing is formed of an opaque material and has a pair of elongated holes made therein to extend in its circumferential direction in opposing relation to said light emitting element and said photo detector, respectively.

6. An automatic rotor type discriminator according to claim 4 wherein an elongated support member is provided which has its opposing end portions bent in the same direction to face each other; and said light emitting element and said photo detector are mounted on the respective end portions of said support member.

7. An automatic rotor type discriminator according to claim 4 wherein said light emitting element is controlled by the output of an oscillator to thereby modulate light from said light emitting element; and the frequency component of said oscillator is taken out from the output of said photo detector and supplied to said deciding means.

8. An automatic rotor type discriminator according to claim 5 wherein air is drawn into said inner housing from the outside through utilization of a negative pressure caused by the rotation of said rotor, the air flowing along said rotor to cool it and flowing out of said inner housing through an air outlet port made in said inner housing, thereafter being released to the outside of the outer housing; and said elongated holes are made in said inner housing on the opposite side from said air outlet port with respect to said rotor.

9. An automatic rotor type discriminator according to claim 1 wherein a further light emitting element and a further photo detector are disposed opposite each other in said outer housing to form therebetween a further optical path; said further light emitting element and said further photo detector being so positioned that when said first type of rotor is mounted on said motor shaft and when said second type of rotor is mounted on said motor shaft, said further optical path is not intercepted by said first or second types of rotors, but that when a third type of rotor, different from said first and second types of rotors, is mounted on said motor shaft, said further optical path is intercepted by said third type of rotor; said deciding means being operative to determine the type of rotor which is mounted on said motor shaft on the basis of the outputs from said first-mentioned photo detector and said further photo detector; and said maximum revolving speed setting means being operative to set the maximum revolving speed of the rotor which is mounted on said motor shaft in accordance with the determination of said deciding means.

10. An automatic rotor type discriminator according to claim 9 wherein said further optical path lies substantially parallel to and above said first mentioned optical path.

11. An automatic rotor type discriminator according to claim 5 wherein said elongated holes are closed by transparent plates.

* * * * *